United States Patent
Hente et al.

(10) Patent No.: US 10,232,928 B2
(45) Date of Patent: Mar. 19, 2019

(54) FILLABLE STOWAGE CONTAINER FOR PLACEMENT IN A CARGO AREA OF AN AIRCRAFT

(71) Applicant: Airbus Operations GmbH, Hamburg (DE)

(72) Inventors: Alexander Hente, Norderstedt (DE); Sascha Nowarre, Riede (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 331 days.

(21) Appl. No.: 15/234,558

(22) Filed: Aug. 11, 2016

(65) Prior Publication Data

US 2017/0043858 A1 Feb. 16, 2017

(30) Foreign Application Priority Data

Aug. 14, 2015 (DE) .......................... 10 2015 113 449

(51) Int. Cl.
*B64C 1/20* (2006.01)
*B65D 88/14* (2006.01)
(Continued)

(52) U.S. Cl.
CPC ............... *B64C 1/20* (2013.01); *B65D 88/14* (2013.01); *B65D 88/54* (2013.01); *B65F 1/14* (2013.01)

(58) Field of Classification Search
CPC .......... B64C 1/20; B65D 88/14; B65D 88/54; B65F 1/14
See application file for complete search history.

(56) References Cited

U.S. PATENT DOCUMENTS 3,517,899 A * 6/1970 Vernon ................. A47B 77/02
  105/327
5,312,182 A * 5/1994 Mlakar ................ B65D 88/005
  312/140

(Continued)

FOREIGN PATENT DOCUMENTS

DE 102006039180 B4 3/2014
DE 10 2013 113 057 A1 5/2015
WO 2013136282 A2 9/2013

OTHER PUBLICATIONS

German Patent Office, German Search Report for German Patent Application No. 10 2015 113 449.7 dated Jul. 12, 2016.

*Primary Examiner* — Justin M Benedik
(74) *Attorney, Agent, or Firm* — Lorenz & Kopf LLP (57) ABSTRACT

A fillable stowage container for placement in a cargo hold area of an aircraft is provided. The stowage container comprises a housing structure, a first stowage segment accommodated in the housing structure, and an access opening for manually loading and unloading of the first stowage segment. The housing structure comprises an outer contour, which is configured to place the stowage container in a cargo area of an aircraft. The housing structure is accessible via the access opening from a cabin area above the cargo area, in which the stowage container can be placed. A second stowage segment is arranged within the housing structure and an access opening is provided for manual loading and unloading of the second stowage segment. Further, the first or the second stowage segment is designed as a waste container for placement of trash and the other stowage segment is designed as stowage compartment.

11 Claims, 4 Drawing Sheets

(51) Int. Cl.
  *B65D 88/54*   (2006.01)
  *B65F 1/14*   (2006.01)

(56) References Cited

U.S. PATENT DOCUMENTS

| | | | | |
|---|---|---|---|---|
| 5,655,734 | A * | 8/1997 | Dahl | B60B 33/0002 |
| | | | | 244/118.1 |
| 6,305,643 | B1 * | 10/2001 | Sankrithi | B64D 11/0007 |
| | | | | 244/118.1 |
| 6,454,208 | B1 * | 9/2002 | Nervig | B64D 9/003 |
| | | | | 244/118.1 |
| 6,663,043 | B1 * | 12/2003 | Luria | B64D 9/00 |
| | | | | 244/118.1 |
| 2005/0133308 | A1 * | 6/2005 | Reysa | B64D 11/0007 |
| | | | | 186/40 |
| 2006/0186268 | A1 * | 8/2006 | Harrington | B64D 11/0007 |
| | | | | 244/118.5 |
| 2014/0367055 | A1 * | 12/2014 | Ebeling | E06B 3/94 |
| | | | | 160/84.06 |
| 2014/0367516 | A1 * | 12/2014 | Lange | B65D 88/14 |
| | | | | 244/118.1 |

* cited by examiner

FILLABLE STOWAGE CONTAINER FOR PLACEMENT IN A CARGO AREA OF AN AIRCRAFT

CROSS-REFERENCE TO RELATED APPLICATION

This application claims priority to German Patent Application No. 102015113449.7, filed Aug. 14, 2015, which is incorporated herein by reference in its entirety.

TECHNICAL FIELD

The embodiments described herein relate to placement of objects aboard an aircraft and is in particular related to a fillable stowage container for placement in a cargo area of an aircraft and with an aircraft.

BACKGROUND

In an aircraft, baggage which was previously checked in by passengers is placed in a cargo area underneath a cabin section, for example. A cargo area may also be used for transport of other goods which are to be transported with the aircraft, for example an airplane. For this purpose, cargo containers are used which are described in DE 10 2013 113 057, for example. Baggage compartments are provided in the cabin section, for example, in which baggage compartments passengers may stow their hand luggage during the flight. Moreover, receptacles are provided in galleys, in which receptacles trash arising during the flight operation may be stored for further disposal. However, it has been found that the space provided for hand luggage may be tight. Moreover, it has been found that the space provided for placement of galley sections is further reduced as to allow placing of as many seats as possible in the cabin section. As a result, shortages arise for placement of trash, for example.

SUMMARY

Hence, one object of the present embodiment relates to providing an improved possibility for placement of goods to be stored in an aircraft.

This object is achieved by the subject matter of the independent claims, wherein further embodiments are depicted in the dependent claims. It should be noted that the following aspects of the embodiment apply to the fillable stowage container for placement in a cargo area of an aircraft as well as to the aircraft.

According to the embodiment, a fillable stowage container for placement in a cargo area of an aircraft is provided. The fillable stowage container comprises a housing structure as well as at least one first stowage segment accommodated in the housing structure, and at least one access opening for manually loading and unloading of the first stowage segment from atop. The housing structure comprises an outer contour which is adapted to usual cargo containers and which is configured to place the stowage container in a cargo area of an aircraft. Moreover, the housing structure is configured to be accessible via the at least one access opening from a cabin area above the cargo area in which the stowage container can be placed.

Further, there is at least one second stowage segment arranged within the housing structure, and, moreover, at least one access opening for manual loading and unloading of the second stowage segment from above is provided. The first or the second stowage segment is designed as a waste container for placement of trash, for example, and the other stowage segment is designed as stowage compartment, in particular for placement of baggage items, catering containers or catering material.

Thus, usage of the cargo area is enabled during the flight for placement of goods which must be stowed during flight operation from the region of the cabin. Thereby, material, objects, or goods to be transported may be inserted, i.e., stowed, from the cabin section into the stowage container located in the cargo area or also be taken from there. On the one hand, additional space for placement of material or goods is provided thereby, and on the other hand, this additional storage capacity may result in a further optimized utilization of the cabin section as storage space to be held there may be further reduced, for example, and as a result, additional seats may be arranged.

The term "fillable" refers to a storage capacity, i.e., a storage region or a container or a receptacle which can be filled with material to be stored or which can be loaded or unloaded.

The stowage container is configured for placement in the cargo area of an aircraft. When referring to an aircraft, this is to be understood particularly as an airplane, but also as a helicopter or a zeppelin.

The term "stowage segment" refers to a capacity within which the storage may take place. For example, a stowage segment may be divided multiple times, for example as to result in stowage sub-segments. Hence, the term stowage segment refers to a region which is provided inside the container for the purpose of storage.

The term "from top" refers to the common arrangement of a stowage container, for example when it is placed on a runway in the common orientation. Typically, stowage containers comprise a floor area or base area with which they can be positioned on a base area or also on a storage system or transport system. The term "base area" refers to the lower region of the stowage container. Hence, the upper region is the region opposite to the base area.

The term "common cargo container" refers to the standards provided in the field of civil aviation, for example to the so-called ULD (unit load device) systems. This refers to standardized dimensioning which are used worldwide as to ensure compatibility of the various manufacturer and provider. Apart from the standards of the civil aviation, also those container dimensions may be used which are provided as standards in military aviation, for example according to the standard dimensions used in the NATO.

The term "accessible" relates, for example, to the filling of the stowage segment, i.e., the insertion of material or goods to be stored, or also to removing of objects from the stowage segment. In other words, the term accessible relates to loading and unloading, or to loading and unloading processes, independent of the size or the type of the stored objects. The term "accessible" does not necessarily mean that an access for persons is possible. This may be provided, but must not be.

The outer contour of the stowage container is, for example, the contour of a so-called LD3-container or of another cargo container of the ULD-system.

The term trash relates to recyclable raw material, recyclable material, recyclable receptacles or also to residual waste.

According to an example, the stowage container is designed as a bifunctional stowage container for simultaneous placement of trash and goods to be stowed during flight.

The access openings may be integrated or designed separately, for example.

According to an example, the stowage segment which is designed as a waste container comprises an upper first access opening via which the stowage segment is accessible from the cabin. Alternatively or additionally, the second stowage segment which is designed as a stowage compartment comprises an upper second access opening via which the stowage segment is accessible from the cabin during flight operation.

For example, access from the cabin is possible during flight operation as to stow the trash arising during the flight operation. According to an example, the stowage container is designed with an integrated access opening at the upper surface, via which integrated access opening access is provided to the access opening of the stowage compartment and to the access opening of the waste container. According to another example, the stowage container is designed with two access openings at the upper surface, one of which is the access to the access opening of the stowage compartment while the other one provides access to the access opening of the waste container.

According to an example, the first stowage segment is arranged underneath the second stowage segment.

Thereby, trash can be stowed in a simple manner in the lower stowage segment, for example, and the upper stowage segment may be used for placement of baggage items, for example, where the baggage items must be stowed or sorted in a targeted manner as to use the space optimally.

According to an example, the first stowage segment is accessible via an opening in the second stowage segment.

For example, an upper opening is provided via which the upper stowage segment is accessible. A further (intermediate) opening is provided underneath the upper opening between the upper and the lower stowage segment.

According to an example, the second stowage segment is provided with a stowage capacity which is at least partially movable with respect to the second access opening.

The movability allows, for example, insertion of baggage items in the region of the access opening and the subsequent moving of the stowage capacity enables that the inserted baggage item is moved away from the region of the access opening as to be able to insert a further baggage item at this position.

According to an example, the stowage capacity comprises individual sub-segments which are formed by a storage structure which is arranged movably in the housing structure.

The movement enables successive access to each one of the sub-segments, for example.

According to an example, the storage structure is formed as a rotatable revolving storage. Here, the individual sub-segments are formed by a rotatably movable housing structure.

According to an example, the storage structure comprises (translationally) movable sub-segments which are movable with respect to the second access opening as to ensure successive access to each one of the sub-segments.

According to an example, a conveyor belt like structure is provided via which the individual sub-segments may be moved continuously, which is possible as a result of a combination of push movement and rotational movement, for example, as to ensure successive access to each one of the sub-segments.

The sub-segments' size may be adapted to common standard units for catering equipment.

According to a further example, the sub-segments' size is (alternatively or additionally) adapted to common dimensions of on-board luggage.

The movable storage structure may be provided with variably adjustable sub-segment sizes, for example, as to provide optimized sub-capacities for stowage according to preferred intended use.

When accessing the lower stowage segment via the upper stowage segment, one sub-segment may remain free, for example, as to grant access to the (intermediate) opening or intermediate flap.

According to an example, the stowage segment which is designed as a waste container comprises an additional lateral access opening via which the stowage segment may be emptied.

In other words, the trash may be removed via the access opening.

Emptying of the waste container happens in the cargo area/cargo load region into transport receptacles provided for this purpose and for disposal of the trash. According to another example, the stowage container is moved out of the cargo area as to then empty the trash outside the aircraft.

According to an example, the stowage container is temporarily placeable in a cargo section of an aircraft, i.e., the stowage container is configured to be inserted in the cargo section or to be also taken out of the cargo section.

According to another example, the stowage container is permanently installable in the cargo section of an aircraft.

According to the embodiment, an aircraft is also provided which comprises a fuselage structure with a cabin space and a cargo area which is at least partially provided underneath the cabin space. A floor structure is provided between the cargo area and the cabin space. Moreover, the aircraft comprises at least one fillable stowage container according to one of the preceding examples, which stowage container is arranged in the cargo area. Moreover, at least one floor opening is provided in the floor structure so that the stowage container is accessible from top via the floor opening from the cabin space.

The term "aircraft" relates particularly to airplanes, but also to helicopters or zeppelins.

The term "cabin space region" refers to the cabin of the aircraft, i.e., the cabin section. The cabin section refers, for example, to the section for placement of passenger seats and supply units as, for example, lavatory sections or galley sections provided for the passengers.

According to an example, the floor opening is provided in an aisle section of the cabin, or in an entrance section, or in a region of a galley.

The galley kitchen is also referred to as galley. The floor opening may be located outside the region where the passenger seats are provided, for example.

Hence, accessibility of the fillable stowage container is also enabled during flight operation without affecting the passengers for this purpose.

According to an example, the fillable stowage container is arranged in the cargo area in a front region or a rear region. The front region is also referred to as FWD-region while the rear region is referred to as AFT-region.

Thereby, the remaining cargo area region is not affected in its flexible usage.

According to an example, a cargo loading system is provided in the cargo area and the fillable stowage container is held by the cargo loading system.

For example, the cargo loading system is also referred to as ULD loading system. For example, the fillable stowage container may be held by the cargo loading system in the same manner as it is provided for cargo containers. The fillable stowage container may also be released and moved via the cargo loading system within the cargo area, so as to be taken out of the cargo section of the aircraft. The fillable stowage container may be placed onto the cargo loading system floor and be temporarily fixed there, for example in a detachable manner.

The term "cargo loading system floor" refers to that structure in an aircraft and its cargo area which is provided in the floor area as to be able to move the containers to be stored and locked onto this system or to be able to stow the containers within the fuselage in a space-optimized manner.

According to an alternative example, the fillable stowage container is fixedly installed in the cargo area.

For example, with a so-called full bulk configuration (cargo section without installed cargo loading system) the fillable stowage container may be firmly held at the fuselage structure.

The access openings may be designed with a movable closure so as to temporarily close the openings. For example, pivotable flaps may be provided, for example floor hatches or floor doors. The openings may also be provided with a closable flap.

According to an aspect of the embodiment, a receptacle is provided which is designed similar as a receptacle which is commonly used as stowage container in the cargo section of the airplane. The inventive container may be loaded or unloaded even during flight operation via an upper access opening in the specifically designed container and an opening in a cabin floor segment matching thereto. Thus, a stowage capacity is provided which is accessible from the cabin during flight operation and which, however, is not provided in the cabin section but in the cargo section. Thereby, in total more space is provided in the cabin section. Due to the fact that depending on the flight connection the cargo section is often only partially used, free space is available here which may be used optimally with the inventive stowage container. By placement of equipment and waste material, an additional use is provided in the cargo section for the cabin section. As a result, placement of the inventive stowage container in the cargo section does not mean an effective loss of storage capacities as the cargo section is typically not completely used, as already mentioned.

Due to the placement of waste in the inventive stowage container in the cargo section during flight operation, lower turn-around-times may be complied with, i.e., lower time periods which are necessary to prepare the cabin section for the new flight passengers during the time between arrival of an airplane and the following departure, for example. This also includes stowage or disposal of waste and also placement of catering material which should be provided for the forthcoming flight. Placement of waste may serve, for example, for transporting the waste back again to the so-called home airport if disposal of the waste is more cost-effective there. Placement of catering equipment in the inventive storage container may mean, for example, that fewer baggage compartment regions in the cabin must be reserved for this purpose so that more volume is provided for the passengers as to place hand luggage. This may also positively affect the periods of time during which the airplane cannot fly. In other words, boarding and unboarding of the passengers which also includes stowage and removing of hand luggage can be further optimized. Access to the storage region may happen during the flight at times at which the passengers are located at their seats and enough time is available as to take catering material, for example, out of the inventive stowage container or to stow this material there again after the on-board service (service aboard during the flight) had happened.

It should be noted that the features of the embodiments of the stowage container also apply to embodiments of the aircraft and vice versa. Moreover, also those features may be freely combined with each other where this is not indicated explicitly.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
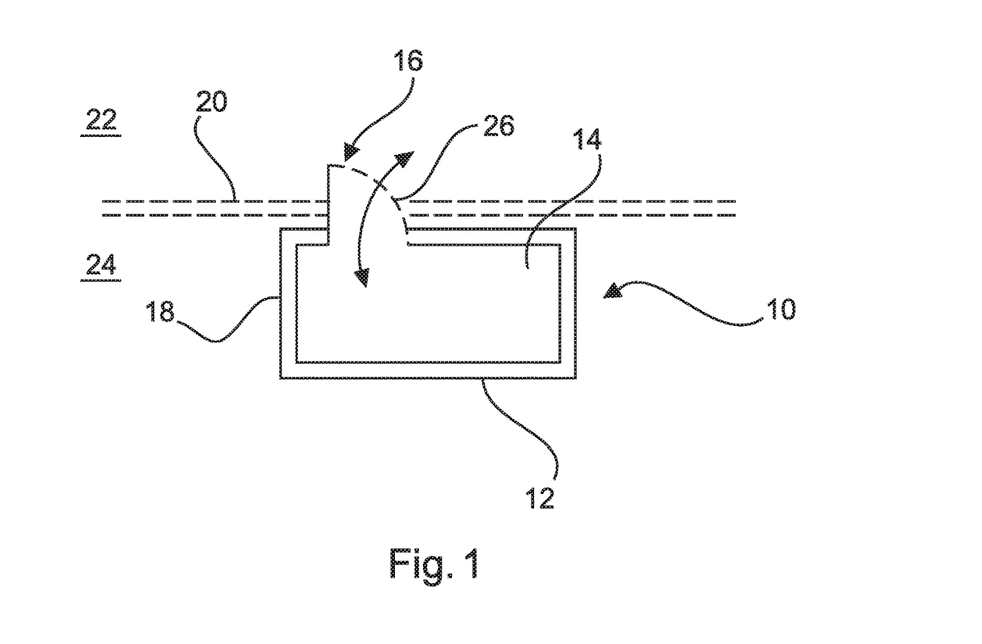
FIG. 1 is a schematic vertical section through an exemplary embodiment of a fillable stowage container for placement in a cargo area of an aircraft.

FIG. 1 shows a fillable stowage container 10 for placement in a cargo area of an aircraft. The stowage container 10 comprises a housing structure 12 as well as at least one first stowage segment 14 accommodated in the housing structure, and at least one access opening 16 for manually loading and unloading of the first stowage segment 14 from atop. The housing structure 12 comprises an outer contour 18 which is adapted to usual cargo containers and which is configured to place the stowage container in a cargo area of an aircraft. The housing structure 12 is configured such to be accessible via the at least one access opening from a cabin area above the cargo area in which the stowage container can be placed.

For this purpose, in FIG. 1 there is indicated a floor with a double dashed line 20 which separates a cabin section 22 arranged above from a cargo area 24 arranged below. Indication by a dashed line should point out that the fillable stowage container 10 is designed for this purpose and that, however, the stowage container 10 itself does not comprises the floor 20.

Anyway, the stowage container 10 or the first stowage segment 14 indicated therein is accessible via the access opening 16 from the cabin section, which is indicated with a double arrow 26.

Design of the contour 18 is in more detail referred to below, for example in the context of FIG. 4 and FIG. 7

Figure 2:
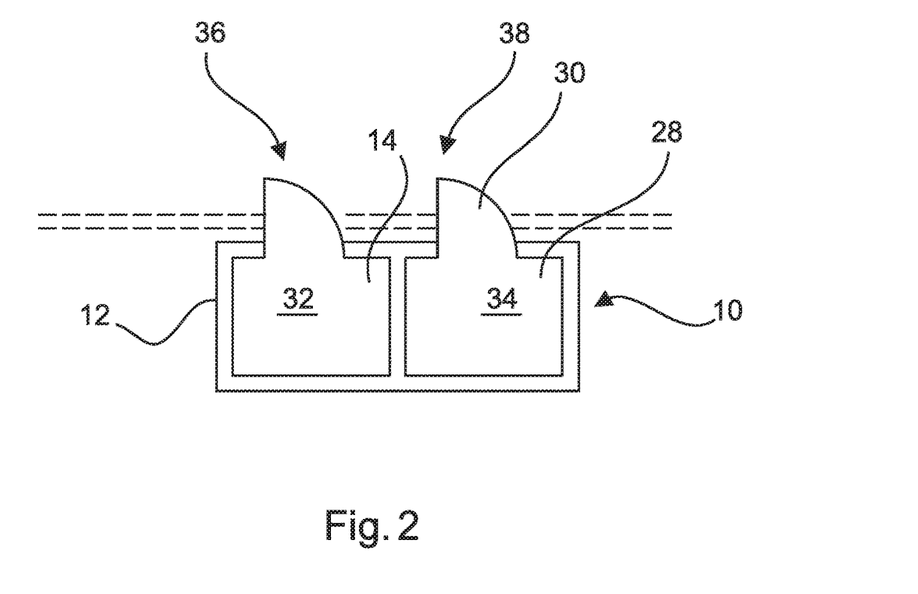
FIG. 2 is a vertical section in a schematic representation through a further exemplary embodiment of a fillable stowage container.

FIG. 2 shows a further vertical section through a further example of the fillable stowage container 10. A second stowage segment 28 as well as a further access opening 30 for manual loading and unloading of the second stowage segment from atop is arranged in the housing structure 12.

For example, the first stowage segments 14 is designed as a waste container 32 for placement of trash and the second stowage segment 28 is designed as stowage compartment 34, in particular for placement of baggage items, catering containers or catering material.

For example, the fillable stowage container 10 is designed as a bifunctional stowage container for simultaneous placement of trash and goods to be stowed during flight.

According to a further example, the first stowage segment 12 is designed as a stowage compartment and the second stowage segment 28 as a waste container.

According to an example which is shown as an option in FIG. 2, the stowage segment which is designed as a waste container comprises an upper first access opening 36 via which the stowage segment is accessible from the cabin. Additionally or alternatively, the second stowage segment which is designed as a stowage compartment comprises an upper second access opening 38 via which the stowage segment is accessible from the cabin during flight operation.

Figure 3:
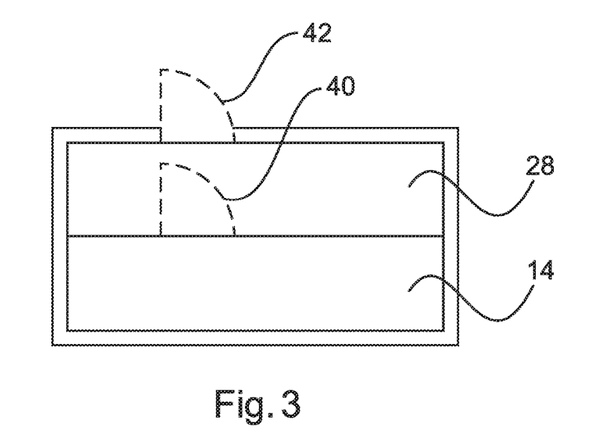
FIG. 3 is a further example of a fillable stowage container in a schematic vertical section.

In FIG. 3, a further example is shown in which the first stowage segment 14 is arranged underneath or below the second stowage segment 28.

According to an option, the first stowage segment 14 is accessible via an opening 40 in the second stowage segment. The second stowage segment is designed with an upper opening 42 as to enable access from the cabin space.

Figure 4:
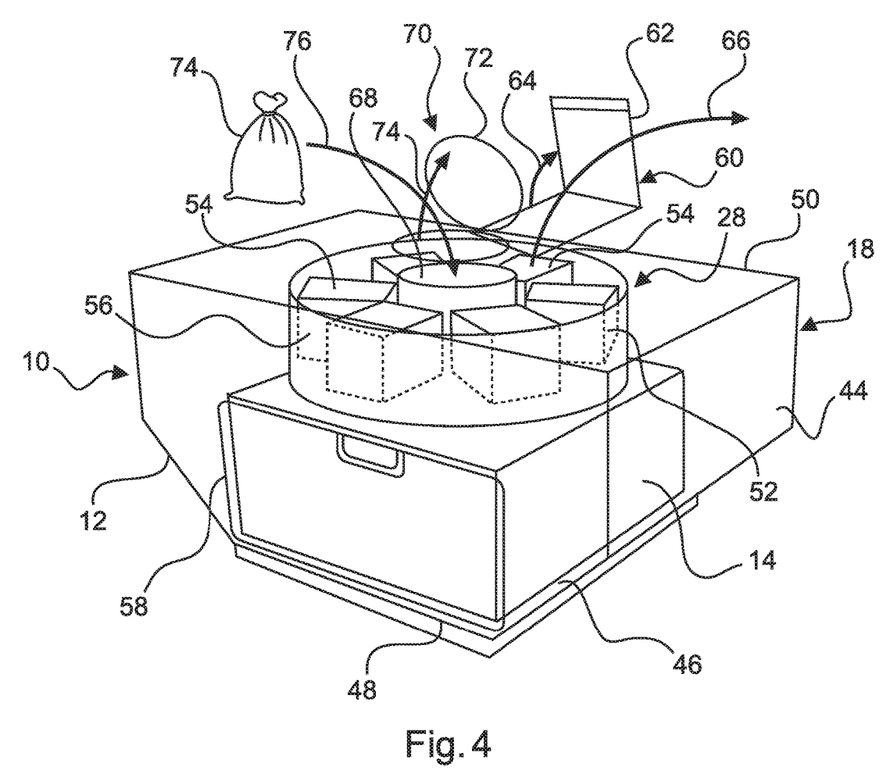
FIG. 4 is a schematic isometric representation of a further example of a fillable stowage container.

FIG. 4 shows an isometric representation of a further example of the fillable stowage container 10. It should be noted that in FIG. 4 multiple options are shown together which, however, may be provided solely or in other variants of combinations with each other.

First, the outer contour 18 should be briefly discussed again. In FIG. 4 it is shown with reference thereto that the outer contour 18 is adapted to contours of common cargo containers, for example so-called LD3-containers of the cargo container system ULD system. For example, the containers are formed with an upper region in their contour, which upper region is protruding with reference to a lower region and is designed with perpendicular lateral wall regions 44 in this region, at which lateral wall regions oblique sides 46 adjoin which are tapered downwards so that the stowage container comprises a base area 48 which is thinner at the sides of its base area in comparison to the upper surface 50. As known, placement is thereby possible in a fuselage segment which has a round cross section in the lower region. In other words, the lateral slants of the contour of the stowage container correspond to the cross section of an aircraft fuselage which tapers downwardly.

In FIG. 4 it is shown as an option that the second stowage segment 28 is provided with a stowage capacity 52 which is at least partially movable with respect to the second access opening or to the access opening, respectively.

In FIG. 4 it is shown as a further option in this context that the stowage capacity 52 comprises single sub-segments 54 which are formed by a storage structure 56 which is arranged movably in the housing structure 12. For example, the storage structure 56 is designed as a rotatable revolving storage.

In a further option which is not shown, the second stowage segment is provided with a stowage capacity which is movable with respect to the second access opening or to the access opening, respectively.

In a further option which is likewise not shown, the second stowage segment is designed as a kind of movable belt which extends within the stowage container and at which the single sub-segments are designed as cases.

In FIG. 4, the first stowage segment 14 is shown below the second stowage segment 28.

As a further option it is provided in FIG. 4 that the first stowage segment 14 or the stowage segment which is designed as waste container comprises an additional lateral access opening 58 via which the stowage segment may be emptied.

According to an option, it is provided that a flap opening 60 is provided above a sub-segment 54 in the cabin floor as to ensure an access to the sub-segment 54 arranged underneath with a cover flap 62, indicated with an arrow 64, for example. With an arrow 66 it is indicated that catering containers may be removed during the flight, for example.

According to a likewise depicted option, it is provided that the access to the waste container arranged underneath is provided via an intermediate opening 68 above which a central waste flap 70 is provided which is designed with a hinged cover 72. An arrow 74 indicated opening of this cover. For example, trash bags 74 may be thrown into the waste container via this central opening, as indicated with an arrow 76.

Figure 5:
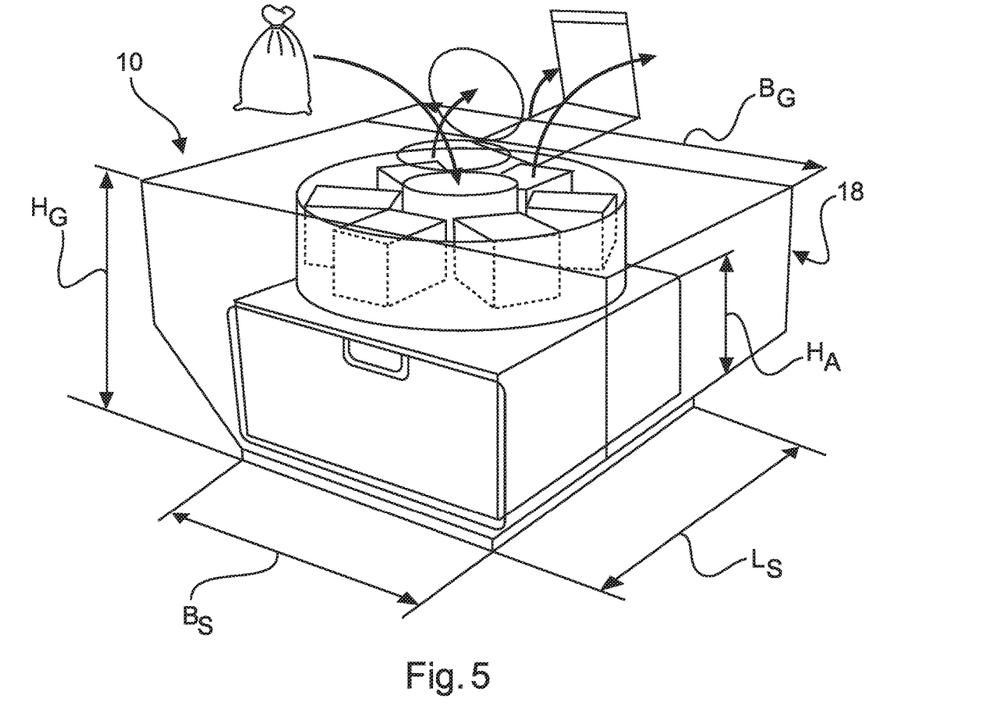
FIG. 5 is the representation of FIG. 4 with indicated dimensional chains.

As already mentioned before, the stowage container 10 adjusted to common cargo containers, not just relating to the outer contour 18 but also relating to the dimensions.

For example, the stowage container 10 may have a total height $H_G$ of 45 inches (about 114.3 cm), and a total width $B_G$ (in transverse direction of the airplane) of 96 inches (about 244 cm). The dimensioning of the total length $L_G$ in longitudinal direction of the airplane, i.e., cross the total width $B_G$, is 60.4 inches (about 153 cm), for example. The stowage container 10 may have a contact area at the base area which has a width $B_S$ of 61.5 inches (about 156 cm) and a length $L_S$ in longitudinal direction of the airplane of 60.4 inches (about 153 cm), that is corresponding to the total length. The waste container has a height $H_a$ of 29.1 inches (74 cm), for example, with a base area which about corresponds to the contact area of the stowage container 10. Thereby, enough space is provided above, as to form a revolving magazine, for example, which is suitable for receiving catering modules.

Figure 6:
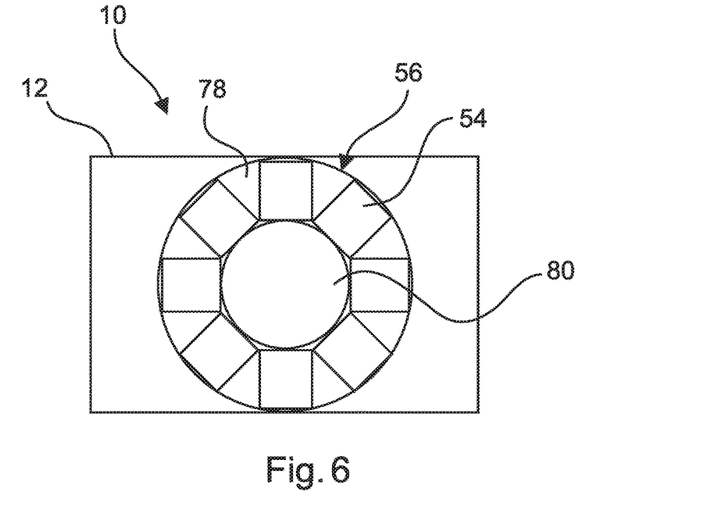
FIG. 6 is a top view onto the example of the fillable stowage container of FIGS. 4 and 5.

In FIG. 6, a schematic top view is shown in which it can be recognized that the fillable stowage container 10 within the housing structure 12 comprises the already mentioned second stowage segment with the sub-segments 54 which are formed by the storage structure 56 which is formed as a rotatable revolving storage, for example. For example, there are provided eight of the sub-segments 54 in total. According to a further option it is provided that also additional sub-segments 78 may be formed between the rectangular sub-segments 54 which are suitable for placement of specific modules. In FIG. 6 it is indicated that an intermediate region 80 is free as to enable access to the waste container, for example.

For example, the sub-segments 54 have a size of about 30 cm. The radius of the inner opening 80 is 40 cm, for example.

It should be noted that the mentioned dimensions are provided as an example for a variant; of course, other (standard) dimensions of the fillable stowage container 10 are provided depending on the provided aircraft, or, in this case, correspondingly other dimensions of the interior structures.

Figure 7:
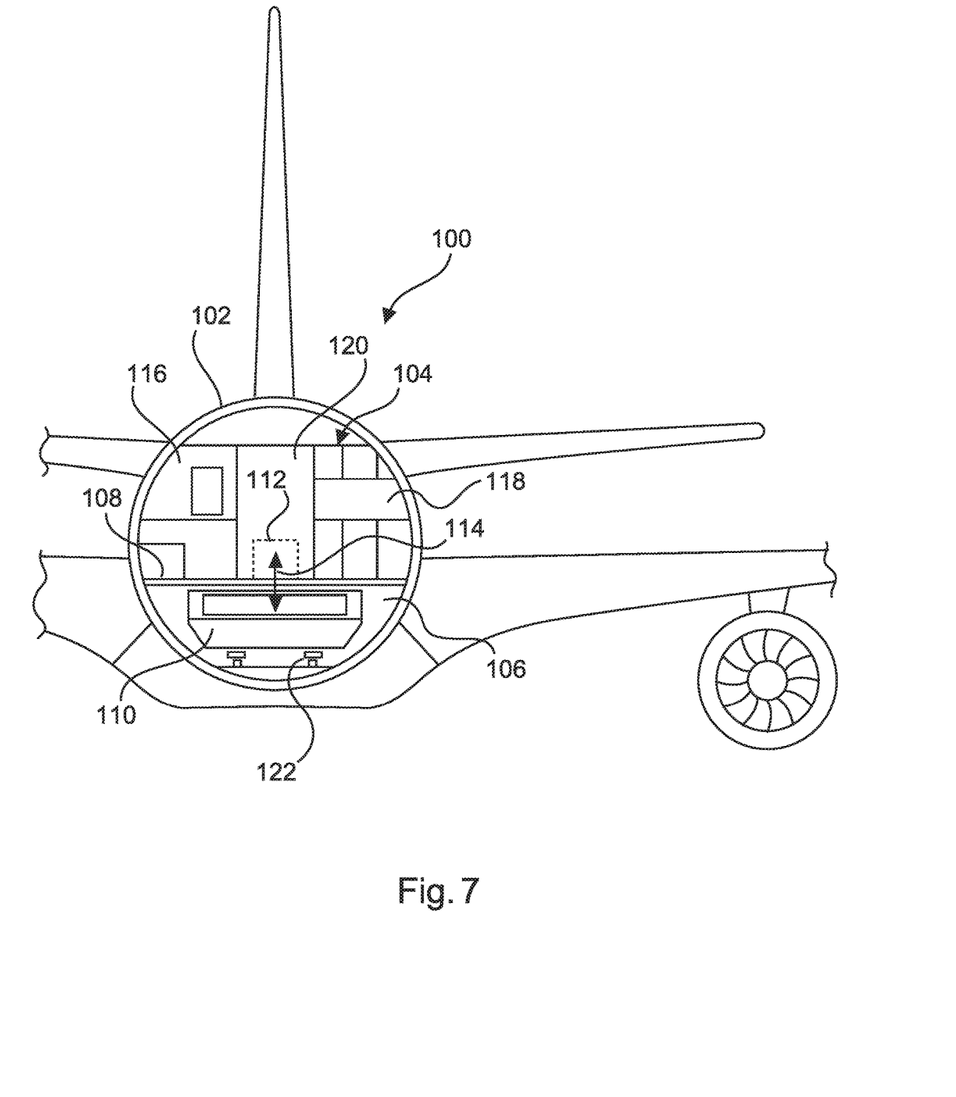
FIG. 7 is a schematic cross section through an aircraft.

In FIG. 7 there is shown a schematic section through an aircraft 100. The aircraft 100 comprises a fuselage structure 102 within which a cabin space 104 and a cargo area 106 are provided, wherein the cargo area is provided at least partially underneath the cabin space. A floor structure 108 is provided between the cargo area 106 and the cabin space 104.

At least one fillable stowage container 110 according to one of the preceding examples is arranged in the cargo area 106. At least one floor opening 112 is provided in the floor structure 108, which floor opening is indicated in FIG. 7 with dashed lines in the open state. Hence, the stowage container 110 is accessible from top via the floor opening 112 from the cabin space 104, as indicated by a double arrow 114.

For example, the floor opening 112 is provided in an aisle section of the cabin, or in an entrance section, or in a region of a galley (not shown).

According to a variant, it is provided that only one opening is provided in the cabin floor, for example that opening via which the sub-segment is accessible. It may then be provided in the movable second stowage segment which is arranged underneath that one sub-segment remains empty and that an additional flap is provided at the lower surface, so to speak as a double bottom, as to make accessible the waste container via these two openings lying on top of each other. In the cabin, space is only required for one opening, i.e. one flap, in this case.

In FIG. 7 there is a lavatory 116 schematically indicated, for example, as well as a galley 118 arranged opposite thereto, wherein an aisle section 120 is provided between these.

The fillable stowage container 110 is arranged in the cargo area 106 in the front or rear region, for example.

A cargo loading system 122 may be provided in the cargo area 106 as to hold the fillable stowage container by the cargo loading system 122.

The fillable stowage container 110 is firmly installed in the cargo area 106 in another example which is not shown. According to another option it is provided that the stowage container is held detachably at the fuselage structure instead of being held by a cargo loading system.

The exemplary embodiments described above may be combined in different ways. In particular, aspects of the method may be used for embodiments of the devices as well as use of the devices, and vice versa.

Additionally, it is noted that "comprising" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A fillable stowage container for placement in a cargo area of an aircraft, comprising:
   a housing structure;
   at least one stowage segment arranged therein; and
   at least one access opening for manual loading and unloading of the stowage segment from top;
   wherein the housing structure comprises an outer contour which is adapted to usual cargo containers and which is configured to place the stowage container in a cargo area of an aircraft;
   wherein the housing structure is configured such to be accessible via the at least one access opening from a cabin area above a cargo area in which the stowage container can be placed;
   wherein at least a second stowage segment is arranged within the housing structure and at least one access opening is provided for manual loading and unloading of the second stowage segment from top;
   wherein the first or the second stowage segment is designed as a waste container for placement of trash and the other stowage segment is designed as a stowage compartment;
   wherein the second stowage segment is provided with a stowage capacity which is at least partially movable with respect to the second access opening; and
   wherein the stowage capacity comprises single sub-segments which are formed by a storage structure which is arranged movably in the housing structure.

2. A fillable stowage container according to claim 1, wherein the stowage segment which is designed as a waste container comprises an upper first access opening via which the stowage segment is accessible from the cabin; and/or
   wherein the second stowage segment which is designed as a stowage compartment comprises an upper second access opening via which the stowage segment is accessible from the cabin during flight operation.

3. A fillable stowage container according to claim 1, wherein the first stowage segment is arranged underneath the second stowage segment.

4. A fillable stowage container according to claim 3, wherein the first stowage segment is accessible via an opening in the second stowage segment.

5. A fillable stowage container according to claim 1, wherein the stowage segment which is designed as waste container comprises an additional lateral access opening via which the stowage segment can be emptied.

6. An aircraft, comprising:
   a fuselage structure with a cabin space and a cargo area which is at least partially provided underneath the cabin space, wherein a floor structure is provided between the cargo area and the cabin space;
   at least one fillable stowage container arranged in the cargo area, each fillable stowage container comprising:
   a housing structure;
   a stowage segment arranged therein; and
   an access opening for manual loading and unloading of the stowage segment from atop;
   wherein the housing structure comprises an outer contour which is adapted to usual cargo containers and which is configured to place the stowage container in a cargo area of an aircraft;
   wherein the housing structure is configured such to be accessible via the at least one access opening from a cabin area above a cargo area in which the stowage container can be placed;
   wherein at least a second stowage segment is arranged within the housing structure and at least one access opening is provided for manual loading and unloading of the second stowage segment from top;
   wherein the first or the second stowage segment is designed as a waste container for placement of trash and the other stowage segment is designed as a stowage compartment;

wherein the second stowage segment is provided with a stowage capacity which is at least partially movable with respect to the second access opening; and wherein the stowage capacity comprises single sub-segments which are formed by a storage structure which is arranged movably in the housing structure; and at least one floor opening in the floor structure;

wherein the stowage container is accessible from top via the floor opening from the cabin space.

7. An aircraft according to claim 6, wherein the floor opening is provided in an aisle section of the cabin, or in an entrance section, or in a region of a galley.

8. An aircraft according to claim 6, wherein the fillable stowage container is arranged in the cargo area in a front or rear region.

9. An aircraft according to claim 6, wherein a cargo loading system is provided in the cargo area and the fillable stowage container is held by the cargo loading system.

10. An aircraft according to claim 6, wherein the fillable stowage container is firmly installed in the cargo area.

11. A fillable stowage container for aircraft, the fillable stowage container comprising:

a housing structure comprising an outer contour adapted to usual cargo containers and configured to accommodate placement of the fillable stowage container in a cargo area of an aircraft;

a stowage segment arranged in the housing structure;

a first access opening for manual loading and unloading of the stowage segment from the top, wherein the stowage segment is configured to be accessible via the first access opening from a cabin area of the aircraft above a cargo area of the aircraft in which the fillable stowage container can be placed;

a rotatable stowage structure arranged in the housing structure above the stowage segment, the rotatable stowage structure configured to revolve within the housing structure; and a second access opening for manual loading and unloading of the rotatable stowage structure from the top, wherein the rotatable stowage structure comprises at least one stowage sub-segment accessible via the second access opening from the cabin area above the cargo area of the aircraft, and wherein the rotatable stowage structure is rotatably movable relative to the second access opening.

* * * * *